(12) United States Patent
Yeh

(10) Patent No.: US 6,299,341 B1
(45) Date of Patent: Oct. 9, 2001

(54) STRUCTURE OF A MIXER DEVICE FOR NEW AND USED PLASTIC MATERIALS

(76) Inventor: Ching Shui Yeh, P.O. Box 82-144, Taipei (TW)

( * ) Notice: Subject to any disclaimer, the term of this patent is extended or adjusted under 35 U.S.C. 154(b) by 0 days.

(21) Appl. No.: 09/635,839

(22) Filed: Aug. 11, 2000

(51) Int. Cl.[7] .................................................... B01F 15/02
(52) U.S. Cl. ........................ 366/76.93; 366/191; 406/117
(58) Field of Search .................. 366/76.1, 76.2, 366/76.6, 76.7, 76.93, 179.1, 182.1, 191; 406/117, 118, 128; 425/580, 583, 584, 585

(56) References Cited

U.S. PATENT DOCUMENTS

| | | |
|---|---|---|
| 3,410,530 * | 11/1968 | Gilman . |
| 3,780,991 * | 12/1973 | Evans et al. . |
| 3,871,629 * | 3/1975 | Hishida . |
| 3,920,229 * | 11/1975 | Piggott . |
| 4,060,223 * | 11/1977 | Bongartz et al. . |
| 4,066,245 * | 1/1978 | Shultz . |
| 4,108,334 * | 8/1978 | Moller . |
| 5,110,521 * | 5/1992 | Moller . |
| 5,148,943 * | 9/1992 | Moller . |
| 5,213,724 * | 5/1993 | Saatkamp . |
| 5,253,994 * | 10/1993 | Zweig et al. . |
| 5,282,548 * | 2/1994 | Ishihara . |
| 5,683,632 * | 11/1997 | Shimizu et al. ..................... 366/76.1 |
| 5,772,319 * | 6/1998 | Pemberton et al. ................ 366/76.2 |

* cited by examiner

Primary Examiner—Charles E. Cooley
(74) Attorney, Agent, or Firm—A & J

(57) ABSTRACT

A mixer for new and used materials includes a closed housing having a bottom formed with an outlet in which is fitted an outlet pipe, a top formed with a first inlet in which is fitted a first inlet pipe, and a side formed with a second inlet in which is fitted a second inlet pipe, the first inlet pipe having an inclined lower end, a cylinder mounted on one side of the closed housing and located opposite to the second inlet pipe, the cylinder having a piston rod extending into the closed housing and connected with a block, the block having an inclined top configured to close the inclined lower end of the first inlet pipe, and a valve mounted on a top of the closed housing and operatively connected with the cylinder.

1 Claim, 3 Drawing Sheets

STRUCTURE OF A MIXER DEVICE FOR NEW AND USED PLASTIC MATERIALS

BACKGROUND OF THE INVENTION

1. Field of the Invention

This invention is related to an improvement in the structure of a mixer for new and used plastic materials, and in particular to one which is low in cost and can operate flawlessly.

2. Description of the Prior Art

Referring to FIG. 1, the conventional mixer 1 for and new and used plastic materials includes a closed housing 10 formed with a new and used material inlets 11 and 12 at one side thereof, two pneumatic cylinders 13 and 14 arranged within the housing 10, two pistons 15 and 16 respectively driven by the two pneumatic cylinders 13 and 14 for opening and closing the inlets 11 and 12, and an outlet 17 arranged under the used material outlet 16. The two pneumatic cylinders 13 and 14 are synchronously switched so that the pneumatic cylinder 13 will retract the piston 15 to open the new material inlet 11 while the pneumatic cylinder 14 will push the piston 16 to close the used material inlet 12, and vice versa. Then, the mixed material will be sucked out of the housing 10 by a vacuuming device (not shown).

However, the conventional mixer must be operated by two pneumatic cylinders which are the most expensive components of the mixer thereby making it impossible to reduce the cost. In addition, if there is something wrong with the switching time of the two pneumatic cylinders 13 and 14, the mixing proportion of the new and used materials will be changed thus influencing the properties of the product and therefore producing a lot of waste products.

Therefore, it is an object of the present invention to provide an improvement in the structure of a mixer for new and used plastic materials, which can obviate and mitigate the above-mentioned drawbacks.

SUMMARY OF THE INVENTION

This invention is related to an improvement in the structure of a mixer for new and used plastic materials.

It is the primary object of the present invention to provide an improvement in the structure of a mixer for new and used plastic materials which is low in cost.

It is another primary object of the present invention to provide an improvement in the structure of a mixer for new and used plastic materials which can operate flawlessly.

According to a preferred embodiment of the present invention, a mixer for new and used materials includes a closed housing having a bottom formed with an outlet in which is fitted an outlet pipe, a top formed with a first inlet in which is fitted a first inlet pipe, and a side formed with a second inlet in which is fitted a second inlet pipe, the first inlet pipe having an inclined lower end, a cylinder mounted on one side of the closed housing and located opposite to the second inlet pipe, the cylinder having a piston rod extending into the closed housing and connected with a block, the block having an inclined top configured to close the inclined lower end of the first inlet pipe, and a valve mounted on a top of the closed housing and operatively connected with the cylinder, whereby when in use, the valve is turned on to cause the piston rod of the cylinder to push the block against the second inlet pipe so that new (or used) material is fed into the closed housing through the first inlet pipe, and when a predetermined amount of new (or used) material has been fed into the closed housing, the control valve is switched to withdraw the piston rod of the cylinder thereby opening the second inlet pipe but closing the first inlet pipe by engaging the inclined top of the block with the inclined lower end of the first inlet pipe, so that used (or new) material is fed into the closed housing through the second inlet pipe, and therefore mixture of the new and used materials is sucked out of the closed housing through the outlet pipe.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
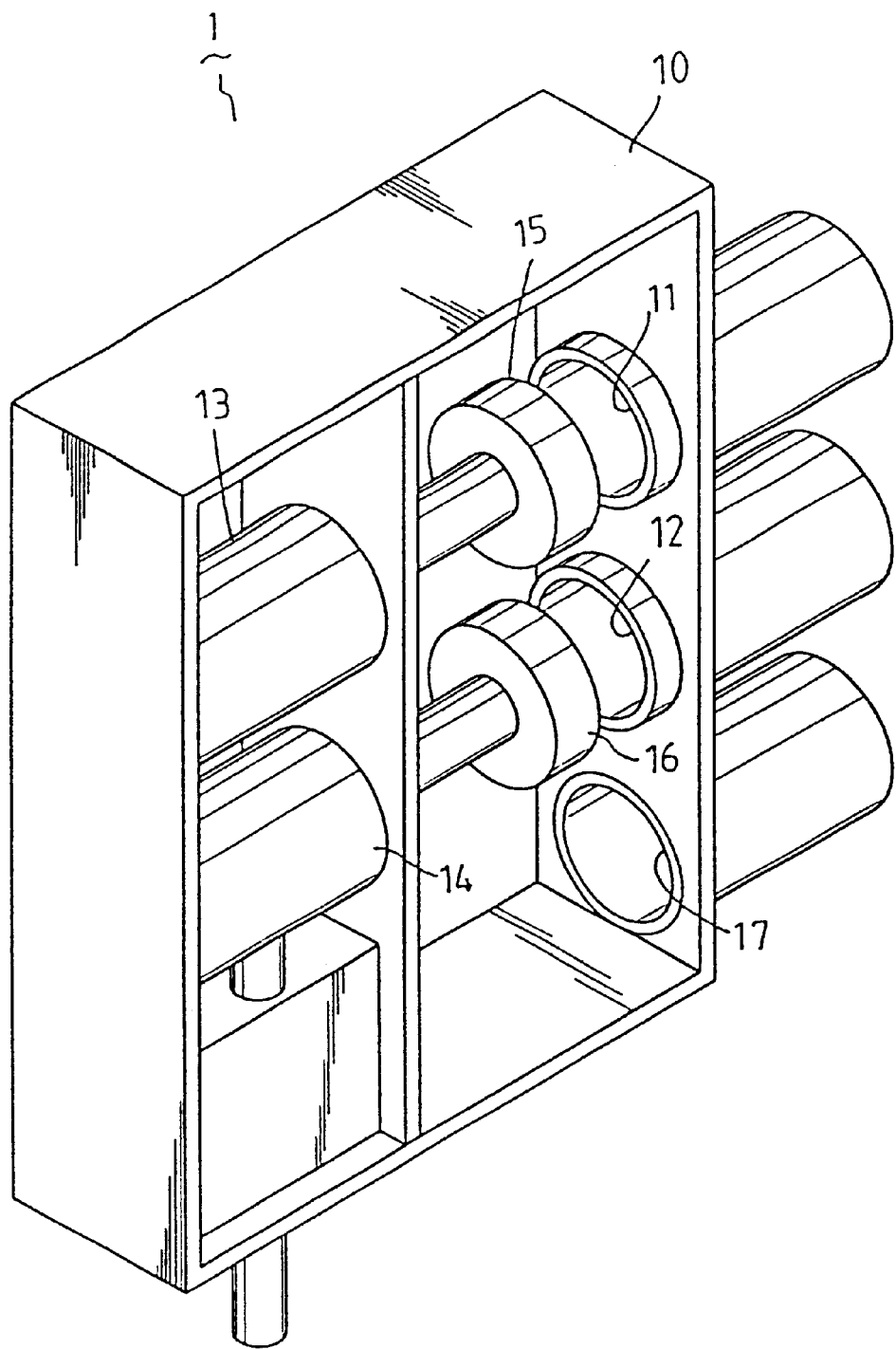
FIG. 1 is a perspective view of a conventional mixer for new and used plastic materials.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such furtyer applications of the principles of the invention as illustrated herein being contemplated as would normally occur to one skilled in the art to which the invention relates.

Figure 2:
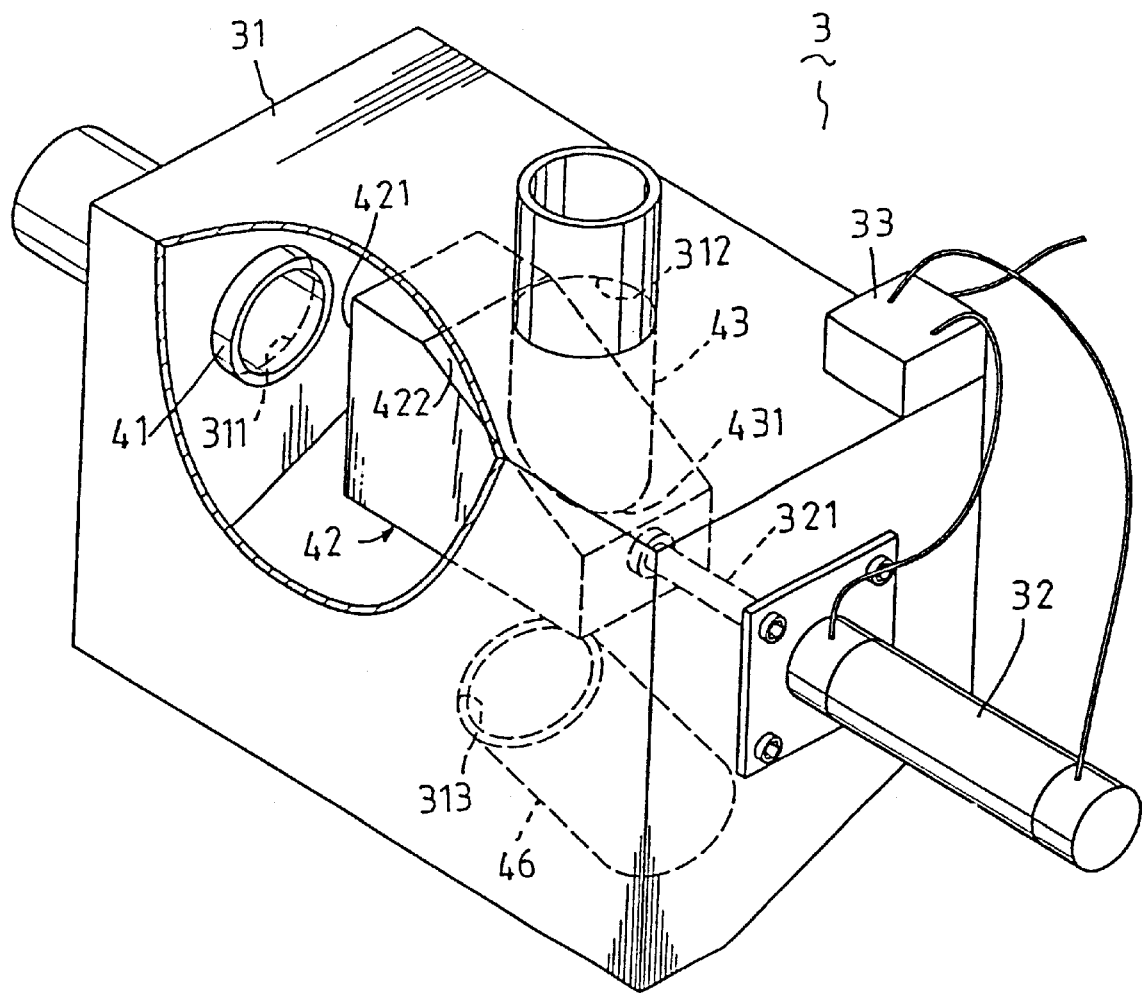
FIG. 2 is a perspective view of the present invention.

With reference to the drawings and in particular to FIG. 2 thereof, the mixer 3 for new and used plastic materials according to the present invention generally comprises a closed housing 31 and a cylinder 32 mounted on one side of the closed housing 31. The closed housing 31 is formed with an outlet 313 at the bottom in which is fitted an outlet pipe 46, a first inlet 312 at the top in which is fitted a first inlet pipe 43, and a second inlet 311 at the side opposite to the cylinder 32 in which is fitted a second inlet pipe 41. The cylinder 32 has a piston rod 321 extending into the closed housing 31 and connected with a block 42. A valve 33 is mounted on the top of the closed housing 31 for controlling the operation of the cylinder 32 thereby controlling the movement of the piston rod 321 within the closed housing 31. The block 42 is a hollow member for reducing the loading of the cylinder 32. The block 42 has an outer end side 421 adapted to close the second inlet pipe 41 and an inclined top 422 adapted to close an inclined lower end 431 of the first inlet pipe 43 (see FIGS. 3 and 4).

Figure 3:
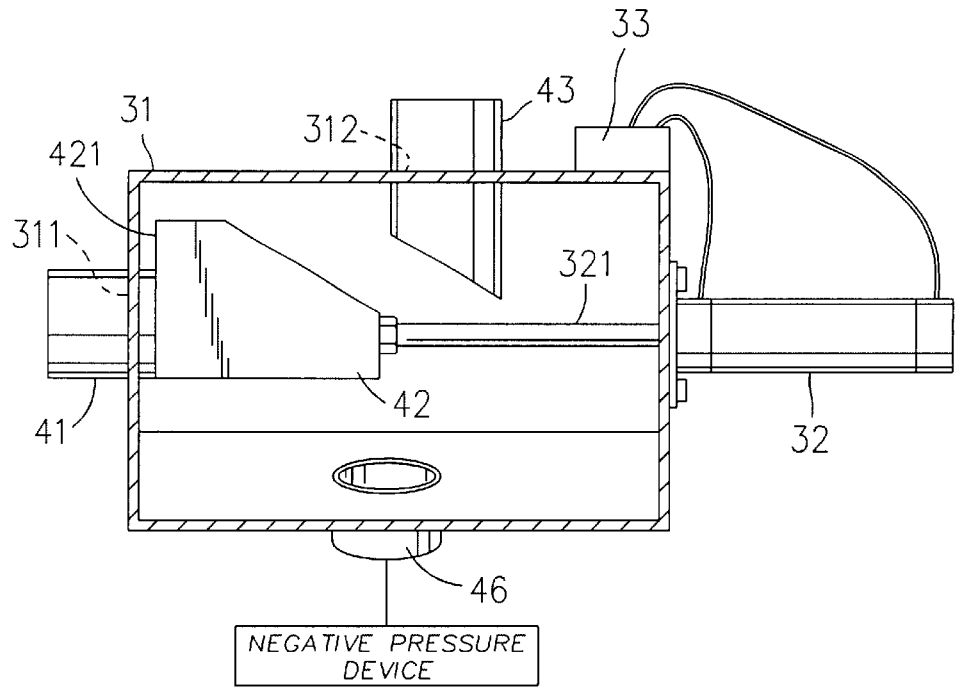
FIG. 3 is a sectional view of the present invention.

Referring to FIG. 3, when in use, the first inlet pipe 43 and the second inlet pipe 41 are connected with a new (or used) material supply (not shown) and a used (or new) material supply (not shown) and then the valve 33 is turned on to cause the piston rod 321 of the cylinder 32 to push the block 42 against the second inlet pipe 41 so that the new (or used) material can be fed into the closed housing 31 through the first inlet pipe 43.

Figure 4:
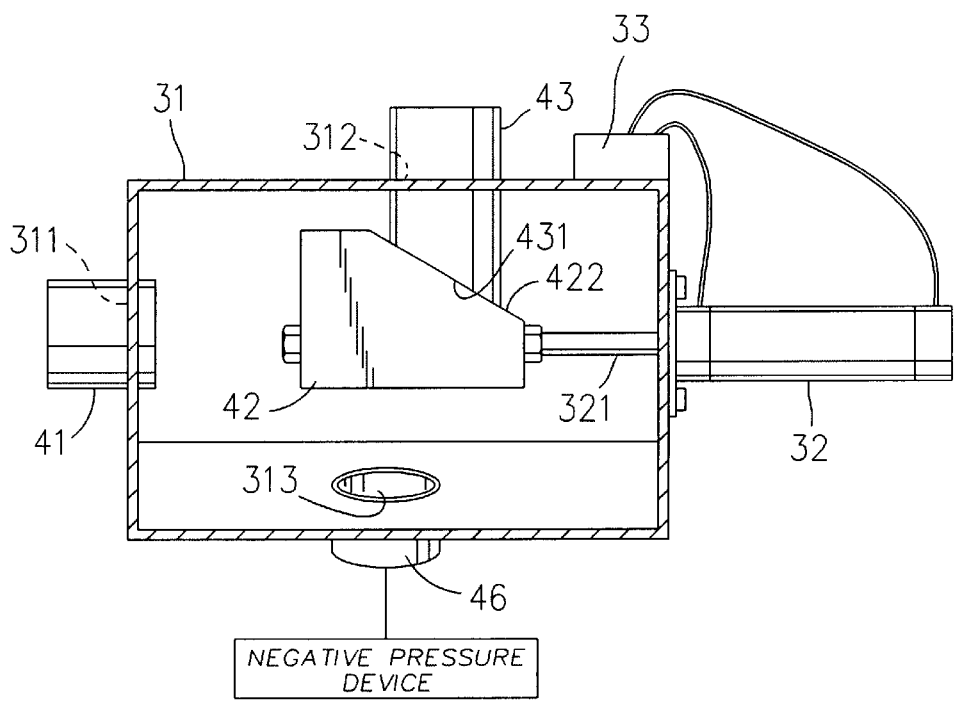
FIG. 4 is a sectional view illustrating the working principle of the present invention.

Referring to FIG. 4, when a predetermined amount of new (or used) material has been fed into the closed housing 31, the control valve 33 is switched to withdraw the piston rod 321 of the cylinder 32 thereby opening the second inlet pipe 41 but closing the first inlet pipe 43 by engaging the inclined top 422 of the block 42 with the inclined lower end 431 of the first inlet pipe 43, so that the used (or new) material can be fed into the closed housing 31 through the second inlet pipe 43. Thereafter, the mixture of the new and used materials is sucked out of the closed housing 31 through the outlet pipe 46 by a vacuuming device (not shown). The mixture of new and used materials is sucked out of the housing 31 via outlet 46 which is self connected to some negative pressure means which creates a negative pressure at the outlet 46 such that the mixture is impelled out of the housing 31.

In brief, the mixer for new and used materials according to the present invention utilizes the piston rod 321 of the cylinder to move the block 42 to against the second inlet pipe 41 thereby closing the second inlet pipe 41 but opening the first inlet pipe 43 for feeding the new (or used) material into the closed housing 31, and then to move the block away from the second inlet pipe to engage the inclined top 422 of the block 42 with the inclined lower end 431 of the first inlet pipe 43 thereby closing the first inlet pipe 43 but opening the second inlet pipe 41 for feeding the used (or new) material into the closed housing 31. As only one cylinder is required for the operation of the mixer, the present invention will be less expensive than the conventional mixer and furthermore the present invention can operate flawlessly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A mixer for new and used materials comprising: a closed housing having a bottom formed with an outlet in which is fitted an outlet pipe, a top formed with a first inlet in which is fitted a first inlet pipe, and a side formed with a second inlet in which is fitted a second inlet pipe, said first inlet pipe having an inclined lower end; a cylinder mounted on one side of said closed housing and located opposite to said second inlet pipe, said cylinder having a piston rod extending into said closed housing and connected with a block, said block having an inclined top configured to close said inclined lower end of said first inlet pipe and being a hollow member; and a valve mounted on a top of said closed housing and operatively connected with said cylinder; whereby when in use, said valve is turned on to cause said piston rod of said cylinder to push said block against said second inlet pipe so that new or used material is fed into said closed housing through said first inlet pipe, and when a predetermined amount of new or used material has been fed into said closed housing, said valve is switched to withdraw said piston rod of said cylinder thereby opening said second inlet pipe but closing said first inlet pipe by engaging said inclined top of said block with said inclined lower end of said first inlet pipe, so that used or new material is fed into said closed housing through said second inlet pipe, and therefore a mixture of the new and used materials is sucked out of said closed housing through said outlet pipe, said mixture of new and used materials sucked out of said housing via said outlet which is self connected to a negative pressure means which creates a negative pressure at said outlet such that said mixture is impelled out of said housing.

* * * * *